(12) United States Patent
Kato

(10) Patent No.: US 7,596,065 B2
(45) Date of Patent: Sep. 29, 2009

(54) OPTICAL DISK RECORDING AND REPRODUCING DEVICE ALLOWING SIMPLE AND FAST SETTING OF AN OPTIMUM RECORD POWER

(75) Inventor: Yoshiyuki Kato, Daito (JP)

(73) Assignee: Funai Electric Co., Ltd., Osaka (JP)

(*) Notice: Subject to any disclaimer, the term of this patent is extended or adjusted under 35 U.S.C. 154(b) by 522 days.

(21) Appl. No.: 11/497,707

(22) Filed: Aug. 1, 2006

(65) Prior Publication Data

US 2007/0025209 A1    Feb. 1, 2007

(30) Foreign Application Priority Data

Aug. 1, 2005    (JP)   ............... 2005-223011

(51) Int. Cl.
     *G11B 7/00*    (2006.01)
(52) U.S. Cl. ............... 369/47.53; 369/53.31; 369/47.5; 369/47.51
(58) Field of Classification Search ............. 369/47.53, 369/53.31, 47.5, 47.51
See application file for complete search history.

(56) References Cited

U.S. PATENT DOCUMENTS

| | | | |
|---|---|---|---|
| 6,711,108 B2 * | 3/2004 | Mashimo et al. | 369/47.53 |
| 2001/0028617 A1 * | 10/2001 | Mashimo et al. | 369/47.53 |
| 2003/0039188 A1 * | 2/2003 | Fukuchi et al. | 369/47.53 |
| 2004/0017755 A1 * | 1/2004 | Kato | 369/59.11 |

FOREIGN PATENT DOCUMENTS

| | | |
|---|---|---|
| JP | 2001-351249 | 12/2001 |
| JP | 2003-67925 | 3/2003 |
| JP | 2003-228840 | 8/2003 |

OTHER PUBLICATIONS

Patent Abstracts of Japan, Publication No. 2003-067925, Publication Date: Mar. 7, 2003, 1 page.
Patent Abstracts of Japan, Publication No. 2001-351249, Publication Date: Dec. 21, 2001, 1 page.
Patent Abstracts of Japan, Publication No. 2003-228840, Publication Date: Aug. 15, 2003, 1 page.

* cited by examiner

*Primary Examiner*—Wayne R Young
*Assistant Examiner*—LaTanya Bibbins
(74) *Attorney, Agent, or Firm*—Osha • Liang LLP

(57) ABSTRACT

A controller calculates a modulation degree of an RF signal provided from a signal processor, and supplies a record power that exhibits the calculated modulation degree matching with a target modulation degree as an optimum record power to a laser driver. More specifically, a modulation degree measuring portion measures the modulation degree of a signal of a predetermined frequency among the RF signals, e.g., a signal of 11T among signals of 3T-11T. The modulation degree measuring portion measures the modulation degree for each record power in OPC. The power determining portion determines a target record power such that the modulation degree measured by the modulation degree measuring portion attains the target modulation degree set by an OPC executing portion.

3 Claims, 3 Drawing Sheets

OPTICAL DISK RECORDING AND REPRODUCING DEVICE ALLOWING SIMPLE AND FAST SETTING OF AN OPTIMUM RECORD POWER

BACKGROUND OF THE INVENTION

1. Field of the Invention

The present invention relates to an optical disk recording and reproducing device, and particularly to a technology of optimizing a record power when recording data on a recordable optical disk.

2. Description of the Background Art

An OPC (Optical Power Calibration) technology has been proposed. In the OPC technology, test recording of random EFM (Eight to Fourteen Modulation) data is effected on a predetermined area of an optical disk, i.e., an area which is formed in a radially inner portion of the optical disk and is referred to as a PCA "Power Calibration Area", with a record power at multiple levels, and thereby the record power is optimized.

More specifically, a power function ($\gamma$) is calculated from a reproduced RF (Radio Frequency) signal of test record data, and a record power (target record power) exhibiting the $\gamma$ value of a predetermined target value is calculated. The optimum record power is determined based on this target record power. The $\gamma$ value is defined by the following equation based on a modulation degree m of the reproduced RF signal and a record power Pw:

$$\gamma=(dm/dPw)/(m/Pw) \quad (1)$$

(dm/dPw) of the right side is a value obtained by differentiating modulation degree m with record power Pw.

In practice, a lead-in area of the optical disk stores a target $\gamma$ value, a parameter $\rho$ for calculating the optimum record power from the target record power, an erase/record power ratio $\epsilon$, a coefficient $\kappa$ for compensating a ratio of (low-speed record erasing power)/(record power) and the like, and these are read from the optical disk to determine the optimum record power and the optimum erase power.

Assuming that a target record power Pwt exhibits the target $\gamma$ value, an optimum record power Pwo is expressed by the following equation:

$$\text{Optimum record power } Pwo=\rho \times Pwt \quad (2)$$

An optimum erase power (2× and 4× speeds) Peo is expressed by the following equation:

$$\text{Optimum erase power (2× and 4× speeds) } Peo=\epsilon \times Pwo \quad (3)$$

Optimum erase power (1× speed) Peo# is expressed by the following equation:

$$\text{Optimum erase power (1× speed) } Peo\#=\kappa \times Peo \quad (4)$$

These target $\gamma$ value as well as $\rho$, $\epsilon$ and $\kappa$ are determined in advance by an optical disk manufacturer under predetermined conditions, and are recorded on the optical disk.

However, modulation degree m used for calculating the $\gamma$ value contains an error such as variations in in-plane sensitivity of a record membrane of the optical disk, and this error causes an error in $\gamma$ value. Therefore, it is difficult to determine uniquely the target record power from the target $\gamma$ value indicated by the optical disk manufacturer, and this results in a problem that the optimum record power cannot be accurately determined without difficulty.

FIG. 4 represents modulation degree m corresponding to various record powers of a test record data as well as changes in $\gamma$ value calculated from the modulation degree m according to the equation (1). In FIG. 4, the horizontal axis gives record power Pw during the test recording, the left vertical axis gives the modulation degree m and the right vertical axis gives the $\gamma$ value. In a prior art, the target $\gamma$ value is set, e.g., to 1.3. Around this target $\gamma$ value, as illustrated in FIG. 4, large variations or wavy changes may occur in $\gamma$ value due to errors in modulation degree m, and it becomes difficult to determine uniquely record power Pw providing the target $\gamma$ value.

In FIG. 4, P0, P1, P2 and P3 are possible values of the record power that can provide target $\gamma$ value ($\gamma$ target), and the optimum record power changes to a large extent depending on the selection of these values. This results in problems that it is difficult to determine the originally optimum record power, and an intended record quality (wavy jitter, error rate and the like) cannot be maintained.

More specifically, when the recording is performed with a record power extremely lower than the originally optimum record power, the jitter and the error rate may be adversely affected. Conversely, when the recording is performed with a record power extremely higher that a primarily or originally optimum value, this adversely affects durability for repetitive recording.

Japanese Patent Laying-Open No. 2003-067925 has disclosed a method of calculating an optimum record power based on an inclination of changes in modulation degree or $\gamma$ value.

In the method according to the above reference, however, it is necessary to detect the inclination of changes in modulation degree or $\gamma$ degree, and therefore the record power must be distributed over a wide range to a certain degree so that an excessive load may be exerted on a semiconductor laser.

Since the record power must be distributed over a wide range, a problem that calibration or adjustment takes a long time also arises.

SUMMARY OF THE INVENTION

The invention has been made for overcoming the above problems, and it is an object of the invention to provide an optical recording and reproducing device that allows simple and fast setting of the optimum record power.

An optical recording and reproducing device according to the invention for performing test recording on a predetermined area of an optical disk with a record power of various values, and thereby determining an optimum record power based on a quality of a reproduction signal of a record data, includes a portion measuring a modulation degree of the test record data, a portion calculating a target modulation degree based on a coefficient related to a record power and included in ADIP (ADress In Pre-groove) information of the optical disk, and a portion determining the record power exhibiting the measured modulation degree matching with the target modulation degree as the optimum record power. The portion calculating the target modulation degree calculates the target modulation degree by performing an arithmetic operation with a predetermined parameter on an estimated value (Pind) of the target record power related to the record power and included in the ADIP information of the optical disk. The optical disk further includes a target $\gamma$ value in the ADIP information.

An optical recording and reproducing device according to the invention for performing test recording on a predetermined area of an optical disk with a record power of various values, and thereby determining an optimum record power based on a quality of a reproduction signal of a record data, includes a portion measuring a modulation degree of the test record data, a portion calculating a target modulation degree based on a coefficient related to a record power and included in ADIP (ADress In Pregroove) information of the optical disk, and a portion determining the record power exhibiting the measured modulation degree matching with the target modulation degree as the optimum record power.

Preferably, the portion calculating the target modulation degree calculates the target modulation degree by performing an arithmetic operation with a predetermined parameter on a coefficient related to the record power and included in the ADIP information of the optical disk.

Particularly, the portion calculating the target modulation degree uses, as the coefficient related to the record power, an estimated value (Pind) of the target record power included in the ADIP information of the optical disk.

Particularly, the optical disk further includes a target $\gamma$ value in the ADIP information.

The optical disk recording and reproducing device according to the invention calculates the target modulation degree based on the coefficient related to the record power and included in the ADIP information of the optical disk, and determines the record power exhibiting the measured modulation degree matching with the target modulation degree as the optimum record power. Since the modulation degree characteristically increases with rising of the record power, the record power can be set to the optimum record power only by calibrating it to achieve the target modulation degree so that it is not necessary to distribute the record power over a wide range, and the optimum record power can be set simply and rapidly.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings. In the following description and drawings, the same or corresponding portions bear the same reference numbers, and description thereof is not repeated.

Figure 1:
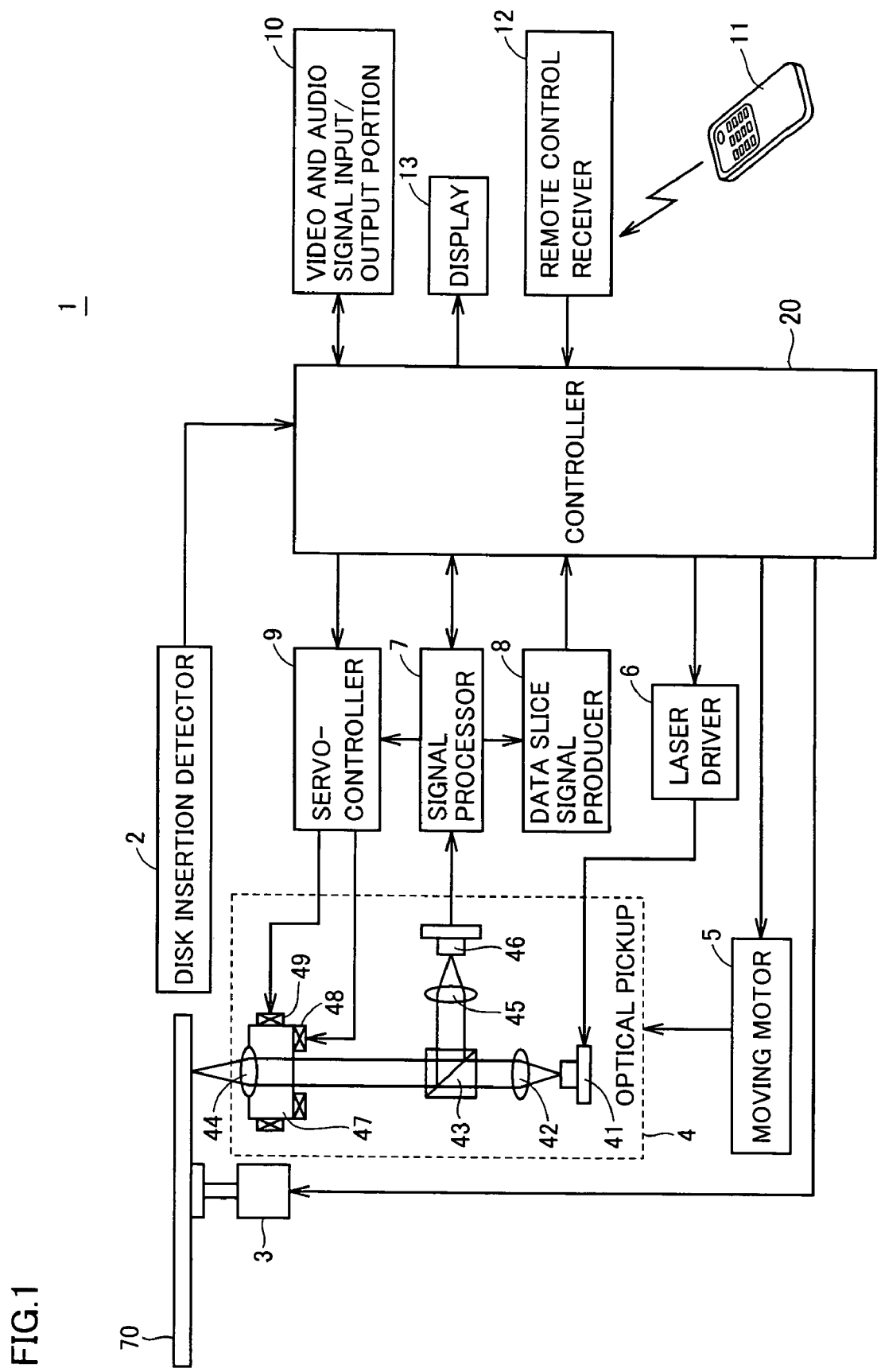
FIG. 1 is a block diagram schematically showing an optical disk recording and reproducing device according to an embodiment of the invention.

Referring to FIG. 1, an optical disk recording and reproducing device 1 according to an embodiment of the invention records information of music, movies or the like on an optical disk such as a DVD provided with concentric or spiral information record track(s), and/or reproduces such information.

Optical disk recording and reproducing device 1 includes a disk insertion detector 2, a spindle motor 3, an optical pickup 4, a moving motor 5, a laser driver 6, a signal processor 7, a data slice signal producer 8 and a servo-controller (focusing controller and tracking controller) 9. Further, optical disk recording and reproducing device 1 includes a video and audio signal input/output portion 10, a remote control 11, a remote control receiver 12, a display 13, a controller 20 for controlling the foregoing various portions, and a disk tray 70.

Disk insertion detector 2 detects an optical disk that is inserted through a disk insertion portion (not shown) and is laid onto disk tray 70, and provides a signal indicative of it to controller 20. The inserted optical disk is attached to spindle motor 3. Spindle motor 3 rotates the optical disk attached thereto at a predetermined speed according to an instruction provided from controller 20.

Optical pickup 4 emits a light beam onto the optical disk for recording and/or reproducing the information, receives a light beam reflected by the optical disk and converts it to an electric signal. According to the instruction provided from controller 20, moving motor 5 formed of a linear motor moves optical pickup 4 radially over the optical disk.

Optical pickup 4 is configured to collect and direct the light beam emitted from a semiconductor laser 41 onto the optical disk through a collimate lens 42, a beam splitter 43 and an objective lens 44. Also, it is configured to receive the light reflected from the optical disk by a photodetector 46 through objective lens 44, beam splitter 43 and a condenser lens 45.

Laser driver 6 that operates in response to instructions provided from controller 20 controls the light emission of semiconductor laser 41. Photodetector 46 is formed of a divided photodiode that has a light receiving surface divided into a plurality of regions, and can provide electric signals corresponding to intensities of light received by respective light receiving surfaces. Photodetector 46 provides its output signal to signal processor 7.

A lens holder 47 holds objective lens 44, and is provided with a focusing coil 48 and a tracking coil 49. Focusing coil 48 is configured to move objective lens 44 in a direction perpendicular to the disk surface of the optical disk by a magnetic operation with respect to a magnet (not shown). Tracking coil 49 is likewise configured to move objective lens 44 in a direction parallel to the disk surface of the optical disk and perpendicular to the record track on the optical disk.

Signal processor 7 produces an RF signal (reflection intensity) based on the output signal of photodetector 46, and provides it to data slice signal producer 8. Data slice signal producer 8 produces a data slice signal by binarizing the RF signal, and provides it to controller 20. Controller 20 detects pits formed on the optical disk based on this data slice signal.

Signal processor 7 produces a focus error signal and a track error signal based on the output signal of photodetector 46, and provides it to servo-controller 9. The focus error signal corresponds to a quantity by which a focus point of light emitted through objective lens 44 onto the optical disk deviates from the optical disk surface, and the track error signal corresponds to the quantity of deviation of the light focus point from the record track.

Servo-controller 9 controls the current supply to focusing coil 48 and tracking coil 49 to move objective lens 44 based on the focus error signal and the track error signal, and thereby performs the servo-control to locate the light focus point on the disk surface of the optical disk and on the record track.

Audio and video signal input/output portion 10 is connected to an external device (not shown) such as a display, a loud speaker or a television set, and operates to output video and audio signals reproduced from the optical disk, and to receive video and audio signals from the external device.

Remote control 11 is employed for controlling various operations of optical disk recording and reproducing device 1, and includes operations keys (not shown) for controlling the various operations. Remote control 11 transmits infrared signals corresponding to key operations, respectively. Remote control receiver 12 receives the infrared signal transmitted from remote control 11, and provides the received signal to controller 20. Display 13 is arranged on a front panel of the body of optical disk recording and reproducing device 1, and displays contents of operations selected by remote control 11, operation situations of optical disk recording and reproducing device 1 and the like.

Description will now be given on the recording and reproducing of the information onto or from the optical disk. The information is reproduced from the optical disk by rotating the optical disk at a predetermined speed by spindle motor 3, emitting the light beam from semiconductor laser 41 to the optical disk and collecting the reflected light by photodetector 46. Servo-controller 9 controls the current supply to focusing coil 48 to move objective lens 44 based on the focus error signal provided from signal processor 7 so that focus-on is achieved to locate the focus point of the light emitted from semiconductor laser 41 on the optical disk surface. Further, servo-controller 9 controls the current supply to tracking coil 49 to move objective lens 44 based on the track error signal provided from signal processor 7 so that track-on is achieved to locate the focus point of the light emitted from semiconductor laser 41 on the desired record track.

After the focus-on and the track-on, servo-controller 9 controls the current supply to focusing coil 48 and tracking coil 49 based on the focus error signal and track error signal so that the focusing servo-control and the tracking servo-control are performed to maintain the focus-on state and the track-on state, respectively.

In the servo-controlled state, data slice signal producer 8 receives and binarizes the RF signal provided from signal processor 7 to provide a data slice signal to controller 20.

Controller 20 detects presence/absence of pits on the optical disk based on the data slice signal, reads the information recorded on the optical disk to reproduce the video and audio signals from the read information and proves them from video and audio signal input/output portion 10 to an external device.

Recording of the information onto the optical disk is likewise performed by forming pits on the optical disk with a laser beam emitted from semiconductor laser 41 in the focusing and tracking servo-controlled states. In this operation, controller 20 encodes the video and audio signals provided from video and audio signal input/output portion 10, and semiconductor laser 41 emits the light according to the encoded data under the control of controller 20. Thereby, the pits corresponding to the encoded data is formed at the record track on the optical disk to record the video and audio information. The pits can be formed by emitting the light from semiconductor laser 41 with a power higher than that in the information read operation.

When the optical disk is rewritable, semiconductor laser 41 emits the laser beam of an erase power (reproduction power<erase power<record power) to erase the recorded data. The data can be recorded in either a manner of forming pits by melting and sublimating the record membrane of the optical disk with the laser beam of the record power or a manner of changing the record membrane in the crystal state into an amorphous state by heating and rapid cooling. This embodiment can employ either of the above manners. The erasing is performed by restoring the amorphous state to the crystal state by emitting the erase power.

The control signal provided from controller 20 determines the record power value in laser driver 6. More specifically, calibration is performed to attain the optimum record power in the PCA area on the optical disk prior to the data recording (OPC).

In the data reproducing operation, optical pickup 4 provides the RF signal to signal processor 7. As already described, signal processor 7 provides the RF signal to data slice signal producer 8 for binarization, and also provides the RF signal to controller 20 for signal quality evaluation after amplifying it.

Controller 20 determines the optimum record power based on the reproduced signal quality of the test data. More specifically, controller 20 calculates modulation degree m of the RF signal provided from signal processor 7, and provides, as the optimum record power, the record power that exhibits calculated modulation degree m matching with a target modulation degree mtg to laser driver 6.

Figure 2:
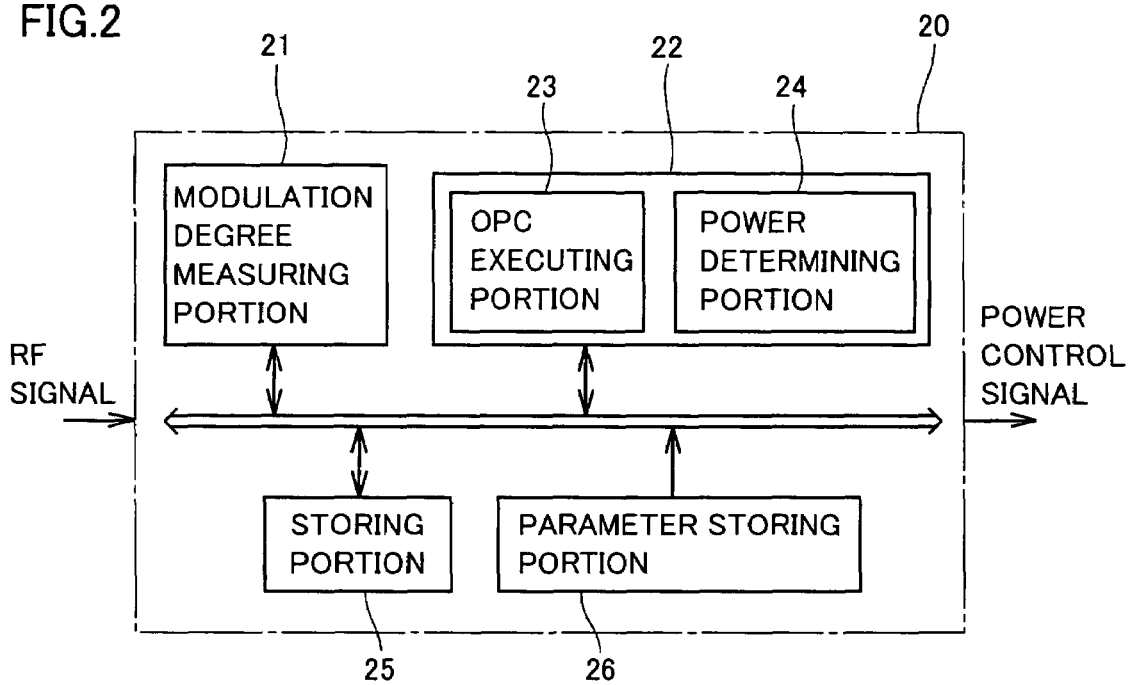
FIG. 2 fragmentarily shows a structure of a controller.

Referring to FIG. 2, controller 20 includes a modulation degree measuring portion 21, an optical power calibrating portion 22, a storing portion 25 and a parameter storing portion 26. Optical power calibrating portion 22 includes an OPC (Optical Power Calibration) executing portion 23 and a power determining portion 24. Modulation degree measuring portion 21, optical power calibrating portion 22 and power determining portion 24 may be formed of a single CPU, and storing portion 25 and parameter storing portion 26 may be formed of a single memory.

Controller 20 is supplied with the RF signal from signal processor 7 via an interface (not shown), and modulation degree measuring portion 21 receives the RF signal thus supplied.

Modulation degree measuring portion 21 measures modulation degree m of a signal of a predetermined frequency among the RF signals, e.g., a signal of 11T among signals of 3T-11T. Modulation degree measuring portion 21 measures modulation degree m for each record power in the OPC.

Power determining portion 24 determines target record power Pwo exhibiting measured modulation degree m matching with target modulation degree mtg. Based on this target record power, the optimum record power is determined according to the equations (2)-(4) already described.

Figure 3:
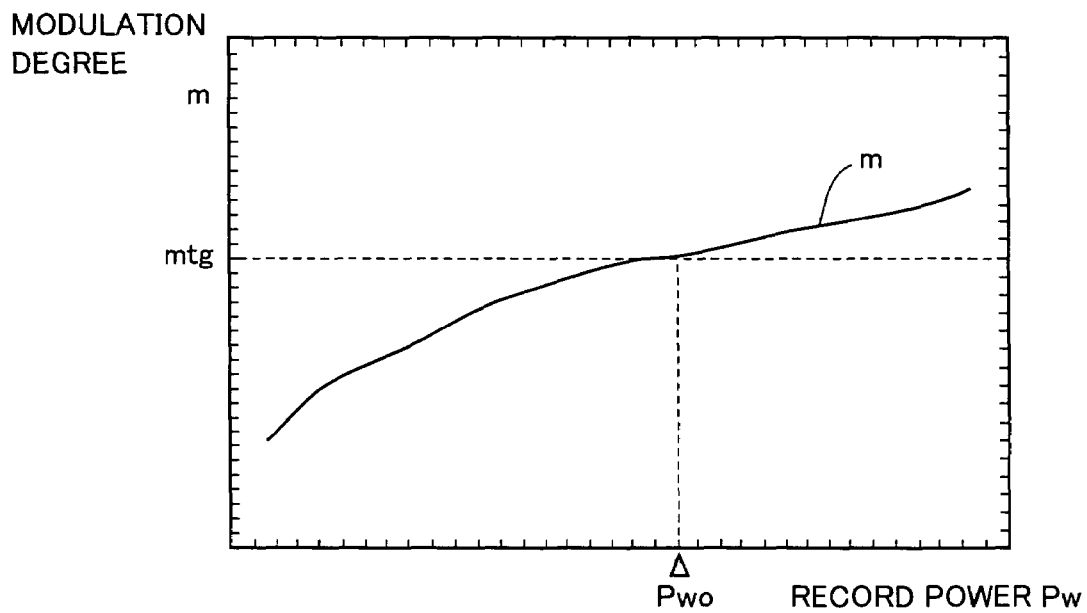
FIG. 3 illustrates determination of a target record power.
Figure 4:
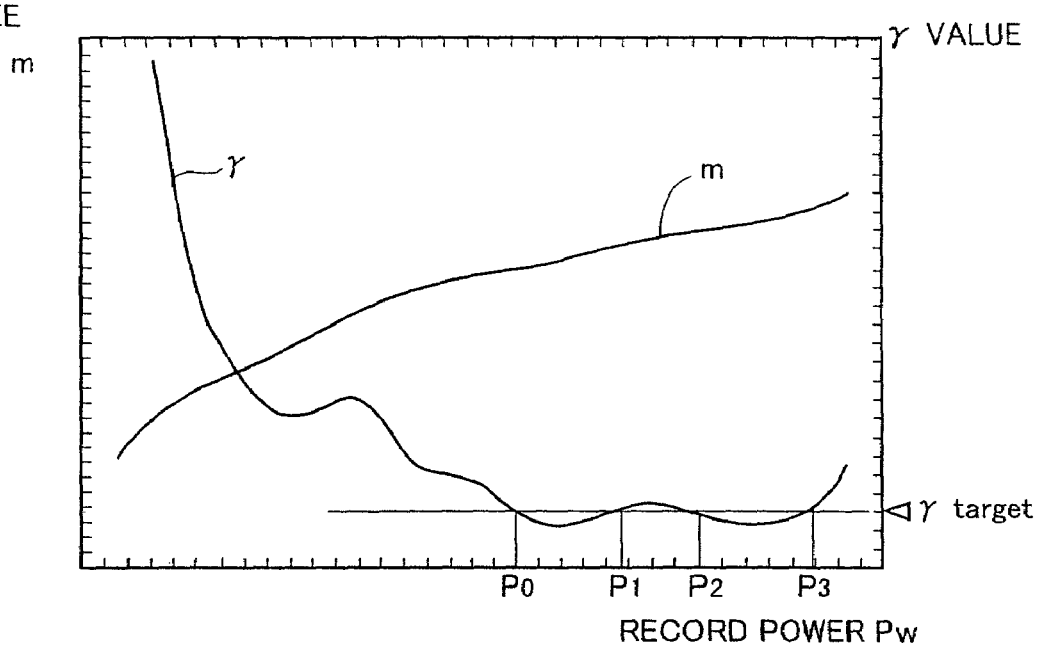
FIG. 4 illustrates large variations or wavy changes in $\gamma$ value due to an error in modulation degree.

Referring to FIG. 3, description will now be given on the determination of target record power Pwo.

In FIG. 3, the vertical axis gives modulation degree m, and the horizontal axis gives record power Pw. Modulation degree m rises with Record power Pw, and record power Pw exhibiting target modulation degree mtg is set as target record power Pwo.

In this embodiment, target modulation degree mtg is set based on a coefficient relating to the record power, and particularly a coefficient that is recorded in advance together with a target γ value as the ADIP (ADdress In Pre-groove) information by a manufacturer of the optical disk. For example, a value (Pind×X) obtained by multiplying an estimated value Pind of the target record power in physical format information by a parameter X is set as target modulation degree mtg. Parameter X may be read by referring to a table that is recorded in advance in parameter storing portion 26 for representing a correspondence between the type of the media and the record speed. Setting of target modulation degree mtg is executed, e.g., by OPC executing portion 23. Power determining portion 24 sets target record power Pwo such that modulation degree m measured by modulation degree measuring portion 21 attains target modulation degree mtg set by OPC executing portion 23.

By the manner according to the embodiment of the invention, and more specifically, by setting target modulation degree mtg based on the coefficient of the ADIP information, target record power Pwo can be uniquely determined.

When the target γ value included in the ADIP information, e.g., of a DVD+RW, the γ value is represented by a function of quantity of change of modulation degree m and record power Pw as represented by the equation (1), and therefore the quantity of change cannot be measured without increasing record power Pw to a certain extent: In the manner according to the embodiment of the invention, however, it is not necessary to increase record power Pw because it is not necessary to use target γ value for measuring the quantity even in the DVD+RW or the like. Since modulation degree m increases with record power Pw according to its characteristics as illustrated in FIG. 3, record power Pw can be set to match with target record power Pwo only by calibrating record power Pw to attain target modulation degree mtg. Therefore, semiconductor laser 41 is not required to perform excessive light emission, which exerts a high load to the laser driver, and this is effective in device maintenance and power consumption.

According to the example of the ADIP information already described, target modulation degree mtg is set using estimated value Pind of the target record power in the physical format information. However, this is not restrictive, and target modulation degree mtg can be set by combining another coefficient included in the ADIP information, e.g., a coefficient ρ that is an amplification factor for obtaining target record power with Tmp information that is a multipulse width setting value. For example, it is possible to employ a relationship of (target modulation degree m=Pind×ρ×Temp coefficient/10). In this example, it is assumed that a coefficient of so-called multipulse width Tmp is used as the Tmp information. Multipulse width Tmp is generally set in a range of (0T<Tmp<1.0T), where T changes with a rotation speed (linear speed) of the disk. For example, 1T is set to 38.10 ns for 1× speed. For 2× speed, 1T is set to 19.05 ns. For 2.4× speed, 1T is set to 15.87 ns. Assuming that there is relationships of (Pind=12.9, ρ=1.16 and multipulse width Tmp=0.5T (Temp coefficient=0.5)), target modulation degree mtg may be set to 0.7482.

As described above, by using more coefficients in the ADIP information stored in the optical disk, it is possible to set the target modulation degree that depends on the characteristics of the disk to a further extent.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical recording and reproducing device for performing test recording on a predetermined area of an optical disk with a record power of a various values, and thereby determining an optimum record power based on a quality of a reproduction signal of record data, comprising:

a portion measuring a modulation degree of said test record data;

a portion calculating a target modulation degree based on a coefficient related to a record power and included in ADress In Pre-groove (ADIP) information of said optical disk; and a portion determining the record power exhibiting the measured modulation degree matching with the target modulation degree as the optimum record power, wherein said portion calculating said target modulation degree calculates said target modulation degree by performing an arithmetic operation with a predetermined parameter on an estimated value (Pind) of the target record power related to the record power and included in the ADress In Pre-groove (ADIP) information of said optical disk, and said optical disk further includes a target γ value in said ADress In Pre-groove (ADIP) information.

2. An optical recording and reproducing device for performing test recording on a predetermined area of an optical disk with a record power of a various values, and thereby determining an optimum record power based on a quality of a reproduction signal of record data, comprising:

a portion measuring a modulation degree of said test record data;

a portion calculating a target modulation degree based on a coefficient related to a record power and included in ADress In Pre-groove (ADIP) information of said optical disk; and a portion determining the record power exhibiting the measured modulation degree matching with the target modulation degree as the optimum record power, wherein said portion calculating said target modulation degree calculates said target modulation degree by performing an arithmetic operation with a predetermined parameter on a coefficient related to the record power and included in the ADIP information of said optical disk, and wherein said portion calculating said target modulation degree uses, as the coefficient related to said record power, an estimated value (Pind) of the target record power included in the ADIP information of said optical disk.

3. The optical recording and reproducing device according to claim 2, wherein said optical disk further includes a target γ value in said ADIP information.

* * * * *